(12) United States Patent
Ciampini

(10) Patent No.: US 11,098,172 B2
(45) Date of Patent: Aug. 24, 2021

(54) METHOD AND FORMULATION FOR IMPREGNATION OF POROUS MATERIALS

(71) Applicant: SICPA HOLDING SA, Prilly (CH)

(72) Inventor: Davide Ciampini, Pavone Canavese (IT)

(73) Assignee: SICPA HOLDING SA, Prilly (CH)

( * ) Notice: Subject to any disclaimer, the term of this patent is extended or adjusted under 35 U.S.C. 154(b) by 148 days.

(21) Appl. No.: 16/302,576

(22) PCT Filed: May 19, 2017

(86) PCT No.: PCT/EP2017/062111
§ 371 (c)(1),
(2) Date: Nov. 16, 2018

(87) PCT Pub. No.: WO2017/198819
PCT Pub. Date: Nov. 23, 2017

(65) Prior Publication Data
US 2019/0300667 A1    Oct. 3, 2019

(30) Foreign Application Priority Data
May 19, 2016    (EP) .................................... 16170329

(51) Int. Cl.
| | |
|---|---|
| *C08J 5/24* | (2006.01) |
| *C08K 3/04* | (2006.01) |
| *C08K 5/14* | (2006.01) |
| *C08F 2/48* | (2006.01) |
| *C08F 20/26* | (2006.01) |
| *C08K 5/5419* | (2006.01) |
| *C01B 32/21* | (2017.01) |
| *C09D 4/00* | (2006.01) |

(52) U.S. Cl.
CPC ................. *C08J 5/24* (2013.01); *C01B 32/21* (2017.08); *C08F 2/48* (2013.01); *C08F 20/26* (2013.01); *C08K 3/04* (2013.01); *C08K 5/14* (2013.01); *C08K 5/5419* (2013.01); *C09D 4/00* (2013.01); *C08F 2500/17* (2013.01); *C08J 2333/14* (2013.01)

(58) Field of Classification Search
CPC ...................................... C08J 5/24; C09D 4/00
See application file for complete search history.

(56) References Cited

U.S. PATENT DOCUMENTS

| | | | |
|---|---|---|---|
| 5,256,450 A | 10/1993 | Catena | |
| 6,656,580 B2 | 12/2003 | Woods | |
| 9,977,161 B2* | 5/2018 | Momoda | ............. C08G 18/8116 |
| 2004/0028834 A1 | 2/2004 | Dove et al. | |
| 2004/0081847 A1 | 4/2004 | Aechtner et al. | |
| 2004/0106509 A1 | 6/2004 | Ochiai et al. | |
| 2006/0264593 A1* | 11/2006 | Nagoh | .................. C08F 283/12 |
| | | | 526/319 |
| 2007/0066698 A1 | 3/2007 | Yang et al. | |
| 2010/0107509 A1 | 5/2010 | Guiselin | |
| 2010/0151242 A1 | 6/2010 | Boehm et al. | |
| 2011/0250410 A1 | 10/2011 | Rygas et al. | |
| 2011/0272629 A1* | 11/2011 | Shin | .................... C09K 19/3475 |
| | | | 252/299.61 |
| 2012/0294557 A1 | 11/2012 | Soelch et al. | |
| 2014/0151606 A1 | 6/2014 | Lowenthal et al. | |

FOREIGN PATENT DOCUMENTS

| | | |
|---|---|---|
| CN | 101016347 | 8/2007 |
| CN | 102245661 | 11/2011 |
| EA | 021157 | 4/2015 |
| EP | 1655342 | 5/2006 |
| KR | 10-2015-0062595 | 6/2015 |
| RU | 2294945 | 3/2007 |
| RU | 2311967 | 12/2007 |
| SU | 211078 | 2/1968 |
| SU | 1742279 | 6/1992 |

(Continued)

OTHER PUBLICATIONS

International Search Report and Written Opinion dated Jun. 12, 2017 with respect to application No. PCT/EP2017/062111, 12 pages.
International Preliminary Examination Report dated Jul. 26, 2018 with respect to application No. PCT/EP2017/062111, 6 pages.
Russian Office Action in counterpart Russian Application No. 2018140411 dated Oct. 13, 2020 (and English language translation of the Office Action).
Vacuum Design Manual (Version 3) Dadaoan, Lanzhou Institute of Physics, Jul. 31, 2004, 3 pages (with English translation).
Chinese Office Action in counterpart Chinese Application No. 201780030697.9 dated Jul. 3, 2020 (and English language translation of the Office Action).

*Primary Examiner* — Wenwen Cai
(74) *Attorney, Agent, or Firm* — Muncy, Geissler, Olds & Lowe, P.C.

(57) ABSTRACT

The present invention relates to formulations for impregnating a porous sintered material and the use as well as methods for impregnating a porous sintered material. More specifically, the present invention relates to formulations for impregnating a porous sintered material, said formulation comprising 40-90 wt.-% of an acrylic monomer,
0.1-10 wt.-% of a radicalic thermal initiator,
0.1-10 wt.-% of a radicalic photoinitiator,
0-30 wt.-% of an organosilane adhesion promoter and
0-5 wt.-% of a siliconic surfactant.

Figure 1:
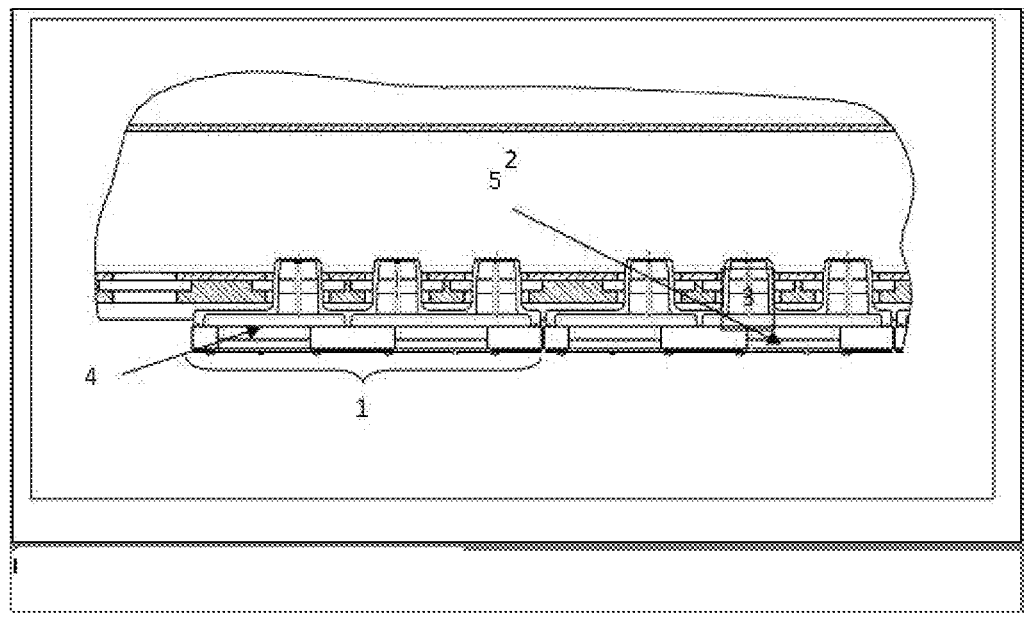

Further the invention relates also to a method for impregnating a porous sintered material, comprising the steps of dipping the porous material into a liquid formulation comprising an acrylic monomer; a radicalic thermal initiator; and a radicalic photoinitiator; vacuum treating of the dipped porous material; removing of excess liquid from the surface of the porous material; exposing of the porous material to light radiation; and heat treating of the porous material.

12 Claims, 1 Drawing Sheet

(56) References Cited

FOREIGN PATENT DOCUMENTS

| WO | 02/076907 | 10/2002 |
|----|-----------|---------|
| WO | 2010053729 | 5/2010 |

\* cited by examiner

METHOD AND FORMULATION FOR IMPREGNATION OF POROUS MATERIALS

TECHNICAL FIELD

The present invention relates to methods and formulations for impregnation/impermeabilization of porous materials. More specifically, the present invention relates to impregnation/impermeabilization of materials to guarantee high chemical resistance to water and/or other solvent based liquids.

BACKGROUND

Porous, in particular sintered materials are usually not compatible with applications where they are requested to be in contact with liquids because of their permeability and low chemical resistance. Examples of this limitation are porous materials that could be useful into a printing system but are not compatible with inks formulations particularly if they contain organic solvents. Organic solvents usually provide to the formulation high wetting power and could easily promote the penetration of the ink through the porous materials.

To limit such a penetration of liquid in a porous material the document U.S. Pat. No. 6,656,580 suggests a method for impregnation of a graphite material by using acrylic and epoxy based formulation in combination with phenolic, vinyl and silicone based resin. The formulation for impregnation according to this document includes further a free radical initiator like heat-curing initiator and anaerobic-curing initiator. These initiators produce free radicals for curing the formulation.

For impregnation according to this document heating is necessary to induce thermal cross-linking of the formulation into bulk. During heating a thermal dilatation of the formulation appears and induces draining of the formulation which is not desired. This draining induces alteration of the final shape of the material to be impregnated, which is not desired.

According to the U.S. Pat. No. 5,256,450 it is suggested to use water miscible monomers as impregnation formulation. The presence of hydrophilic groups in the molecules, necessary to confer the solubility in water, on the other hand increase the polarity of the final polymer leading to the risk of swelling due to more polar solvents contained in the inks used. Also this can lead to an undesired alteration of the final shape of the material to be impregnated.

It is an object of the present invention to provide a system and method addressing these needs and solving the drawbacks from the prior arts.

SUMMARY

The above mentioned problems and drawbacks of the conventional concepts are solved by the subject-matter of the embodiments of the present invention.

DETAILED DESCRIPTION

According to one aspect, the invention suggests a formulation for impregnating a porous sintered material. This formulation comprises
40-90 wt.-% of an acrylic monomer,
0.1-10 wt.-% of a radicalic thermal initiator,
0.1-10 wt.-% of a radicalic photoinitiator,
0 to 30 wt.-% of a organosilane adhesion promoter and
0 to 5 wt.-% of a siliconic surfactant.

Preferably, the formulation contains at least an organosilane adhesion promoter or a silicone surfactant, and more preferably the formulation contains both an organosilane adhesion promoter and a silicone surfactant.

The amount of the organosilane adhesion promoter in the formulation preferably is 5-25 wt.-%.

The amount of the silicone surfactant in the formulation preferably is 0.05-1 wt.-%.

The amount of the acrylic monomer in the formulation preferably is 60-80 wt.-%.

The amount of the thermal initiator in the formulation preferably is 2.5-7.5 wt.-%.

The amount of the photoinitiator in the formulation preferably is 1-5 wt.-%.

The formulation according the invention is able to permeate into a porous material and comprises inter alia a thermal and a photo initiator and is therefore photo/thermally curable.

By a photo/thermal curable acrylic formulation according to the invention and the related method to impregnate porous materials, high chemical resistance of the final device with water and solvent based liquids is achieved. The impregnation method is usually compatible with the other assembly steps.

Good results were achieved, when the porous sintered material is graphite. Such a devise built from graphite could for example be part of an ink-jet printing system.

In order to develop a device which is in contact with liquids, it is necessary to use materials compatible with said liquids. For example in order to develop a printing system, the inks mustn't damage the constituting parts of it so as to avoid defects during the life of the printing machine.

The impregnation material according to the invention does not further alter the surface topography and reliefs of the surface of the porous material and is stable at temperatures till to 200° C. without releasing any formulation component. The impregnation materials according to the invention are further stable through the entire life of the system in which they are used in order to prevent any defect of the machine.

According to a preferred embodiment of the invention the acrylic monomer is selected from the group consisting of 1,6-hexanediol dimethacrylate, 1,4-Butanediol dimethacrylate 95% (Sigma-Aldrich), Glycerol propoxylate (1PO/OH) triacrylate (Sigma-Aldrich), Neopentyl glycol diacrylate (Sigma-Aldrich) and/or Di(trimethylolpropane) tetraacrylate (Sigma-Aldrich).

Further, the radicalic thermal initiator is preferably selected from the group consisting of Benzoyl Peroxide, tert-Butyl hydroperoxide (Sigma-Aldrich), Dicumyl peroxide (Sigma-Aldrich), Lauroyl peroxide (Sigma-Aldrich) and/or tert-Butyl peroxide (Sigma-Aldrich).

Advantageously the radicalic photoinitiator is selected from the group consisting of ESACURE 1001, ESACURE KTO-46 (Lamberti Spa), ESACURE ONE (Lamberti Spa), ESACURE ITX (Lamberti Spa) and/or ESACURE KIP 160 (Lamberti Spa).

Good results could be achieved, when the viscosity for the formulation is in the range of 1-50 cP and/or the porosity of the sintered material is in the range of 2% to 8% in volume, with an average value of 5%.

According to another aspect, the invention refers to a method for impregnating a porous sintered material, comprising the steps dipping the porous material into a liquid formulation comprising an acrylic monomer, a radicalic thermal initiator, and a radicalic photoinitiator; vacuum treating of the dipped porous material; removing of excess liquid from the surface of the porous material; exposing of the porous material to light radiation; and heat treating of the porous material.

The radicalic photoinitiator, which is part of the formulation, photoinitiates the cross-linking of the formulation on the surface of the graphite material. The surface photoreticulation or cross-linking hereby limits or even prevents the draining of the formulation from the impregnated porous material during the heating of the material executed in order to reticulate the impregnated material in bulk. The heating induces thermal reticulation of the formulation into the bulk but induce a thermal dilatation of the formulation before of the reaction; the dilatation induces a draining effect of the formulation outside of the graphite.

According to the invention a radicalic photoinitiator is used in the formulation to photoinitiate cross-linking of the formulation on the surface of the porous material. The surface photoreticulation/cross-linking is used according to the invention to prevent the draining of the formulation from the impregnated graphite during heating of the material executed in order to cross-link the impregnated material in in the material (the pores, etc.). The heating is necessary to induce thermal reticulation of the formulation into the bulk. As a side effect, the heating can induce a thermal dilatation of the formulation before of the cross-linking reaction takes place. The dilatation can induce a draining effect of the formulation out of the porous material.

The presence of a photoreticulated fraction shows the positive effect, that surface alterations of the porous material can be reduced or avoided. Like this the topography of the graphite is not altered by the impregnation procedure.

The thermal initiator advantageously increases the speed of the cross-linking reaction and therefore decreases the reaction temperature and to the final conversion degree of reactive functionalities is increased.

The impregnation formulation and the method for impregnating can provide to a porous material a high chemical resistance towards water and solvents.

Further after the impermeabilization process the porous object shows no or only minor alterations of the final external topography.

In plus the impermeabilized object shows good thermal and mechanical compatibility to possible further manufacturing process steps.

According to a preferred embodiment of the invention the vacuum treatment is conducted at a pressure of 10 mbar, preferably 0.01-2 mbar, more preferably 0.1-0.7 mbar, for 10 minutes to 3 hours, preferably for 1 hour to 2 hours.

Light exposing is preferably executed at wavelengths of 200-400 nm and more preferred in an inert atmosphere.

It was found that good results can be achieved, when the heat treatment is conducted at temperatures of 80-200° C., preferably 100-160° C., for 160 min, preferably 5-30 min.

According to another aspect, the invention relates to the use of the formulation for impregnation of a printing module.

SHORT DESCRIPTION OF THE DRAWINGS

Figure 2:
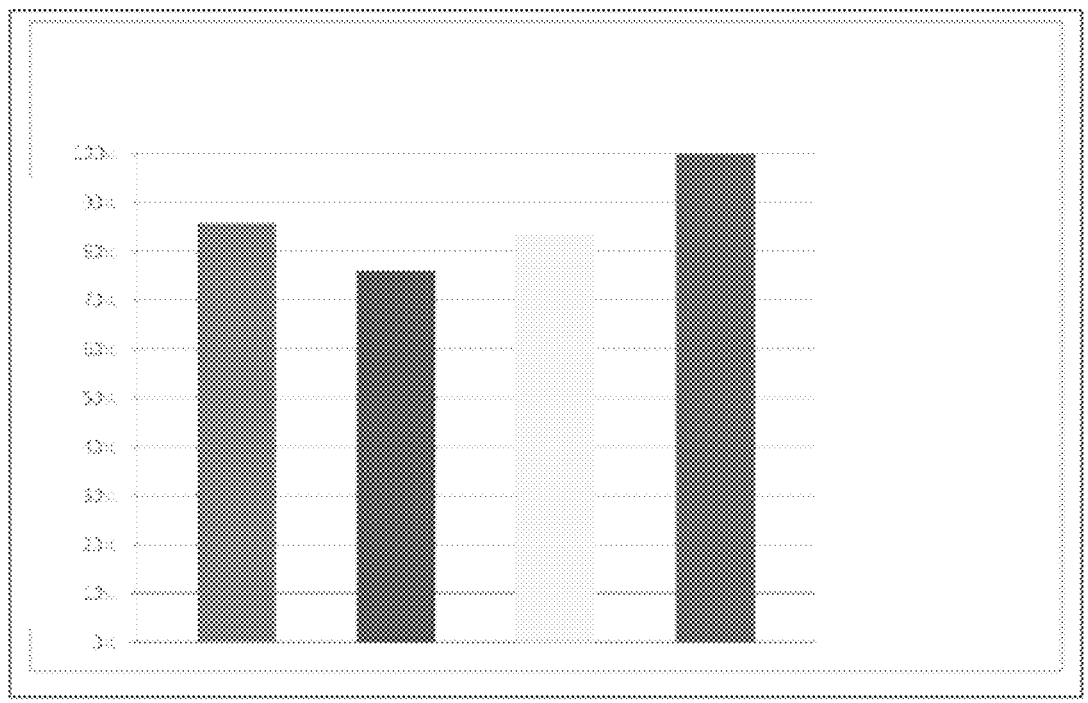

The present invention will be described for the sake of better understanding by way of examplary embodiments. These embodiments may be best understood by taking the following drawings in consideration. In these figures, FIG. 1 shows cross-section of a print-bar. The reference signs present therein have the following meanings:

1 printing module
2 macrohydraulic channel
3 through holes
4 porous material
5 ejector group FIG. 2 shows a graph of the conversion of methacrylic functionalities of a preferred formulation according to the invention as a function of the process applied; and

DESCRIPTION OF PREFERRED EMBODIMENTS

For example in order to develop an ink-jet printing system for water and/or solvent based inks it is necessary to have a set of materials compatible with the liquids to be printed via the printing system. The liquids mustn't damage the constituting parts of the printing system in order to avoid defects during the life of the printing machine.

Usually a printing bar of a printing system comprises a series of printing modules (1) such as that represented in FIG. 1.

In such a printing bar ink is coming from an ink reservoir and reaches the ejector groups by passing through holes dug into a porous material (4).

The printing bar is composed by one or more than one graphite modules (1), each connected to a macrohydraulic channel (2) by passing through holes (3). The channel conveys the ink to the modules and specifically to each ejector group (5).

Preferred materials used for the porous material (4) have a linear thermal dilatation coefficient as similar as possible to silicon ($\approx 3*10^{-6\circ}$ C.$^{-1}$) as the printhead will contain silicon parts, which will be bonded to the porous material (4). The similarity of the two thermal coefficients avoids damages to the silicon chips once bonded to the porous material (4), these damages can be a consequence of thermal stresses due to the manufacturing process.

There are not so many materials on the market involving reasonable cost and easy workability by means of common techniques and linear thermal dilatation coefficient near to $10^{-6\circ}$ C.$^{-1}$. One of these materials is graphite. Graphite can be easily machined with workshop equipment starting from a block of suitable thickness, without the need of any molding process. Sintered ceramics could be an alternative option, but a mold might be preferable, because of the hardness of the material. Also Silicon provides a suitable thermal dilatation coefficient.

Graphite is often characterized by a high porosity (at micro and nanometric scale) that could be a problem under the point of view of permeability to liquids and compatibility with glues or encapsulants used during the assembling process.

According to the invention an impregnating liquid formulation was developed, suitable for the application and compatible with the manufacturing process.

The liquid formulation according to the invention comprises an acrylic polymerizable monomer, which generates the solvent resistant final polymer once permeated into the porous material; and a radicalic thermal initiator, which initiates thermal cross-linking of the monomers into the bulk of porous material; and a radicalic photoinitiator, which photoinitiates the reticulation onto the surface to the porous material, whereby avoiding the draining of the formulation during heat curing; and optionally an organosilane adhesion promoter, which improves the adhesion of the polymer toward the porous material; and optionally a siliconic surfactant, which increases the wettability of the formulation toward the porous material during impregnation.

The liquid formulation is able to permeate into the porous material, such as graphite, by means of a vacuum treatment of the material dipped into the liquid.

The viscosity (in the range of 1-50 cP) of the liquid formulation is suitable to a high and relatively fast permeation into the porosity of the used material; in particular it has been tested a graphite based material having an average porosity of about 5 vol.-%. Generally, the porous material (4) has an average porosity of 1-15 vol.-%, preferably 2-8 vol.-%, measured by image analysis made on calibrated pictures acquired through high magnification optical microscopy as well as scanning electron microscopy, both at the surface and in the bulk of the material.

After a vacuum treatment of the graphite based material dipped into the liquid formulation at a pressure in the range of 0-10 mbar for 10 minutes to 3 hours said graphite material increases its weight by 4-9%, preferably 6-8%.

This liquid formulation fills the totality of the graphite porosities, without altering the surface topography and reliefs present on its surface. The excess of the liquid formulation could be easily removed by means of an adsorbent paper after the vacuum dipping step.

The liquid formulation remains adsorbed into the porous material without dribble during the handling of the object.

A peculiarity of the liquid impregnant formulation is to be both photo and thermally reticulable.

In order to have a high resistance of the impregnant into the porous material toward water and or solvent based inks, the liquid must be able to reticulate on the graphite surface and into its bulk.

After the vacuum treatment and after the removal of the liquid excess from the surface of the graphite material by means of a lint free tissue, the object is exposed to UV radiation (wavelengths of 200-400 nm) on both sides. The exposure energies for each side must be ≥200 mJ/cm$^2$, and the process should be preferably performed in inert atmosphere.

The photoreticulation step brings to a surface reticulated polymeric coating having a good mechanical resistance. This is important because during the following heating step (120° C.), when the thermal initiator (benzoyl peroxide) induces the reticulation of acrylate monomers inside the bulk of the material, the liquid formulation present into the bulk undergoes a thermal expansion before starting the reticulation. If there was no photoreticulated coating on the graphite surface the liquid impregnating the bulk of graphite material would expand draining outside and deforming/altering the topography and reliefs present onto the surface.

Once the formulation contained into the porous material reaches a temperature of 100-120° C., the reactive species reticulate quickly. The reticulation time is about 10 minutes, preferably 5 to 40 minutes, most preferably 7 to 13 minutes.; this time is necessary in order to reach a uniform temperature of the total volume of the porous material.

One example for a preferred formulation according to the invention is the formulation AB69 with the following ingredients:

71.8 wt.-% 1,6-hexanediol dimethacrylate (Sigma-Aldrich) as acrylate monomer;

20.3 wt.-% Silquest A174NT (Momentive) as silane-acrylic adhesion promoter;

5.07 wt.-% Benzoyl peroxide (Sigma-Aldrich) as radicalic thermal initiator;

2.63 wt.-% ESACURE 1001 M (Lamberti) as photoinitiator; and 0.2 wt.-% Byk 310 (Byk-Chemie) as surfactant.

SO the formulation contains a radicalic thermal initiator (benzoyl peroxide) and a photoinitiator (ESACURE 1001M) in order to guarantee the surface reticulation after the impregnation and cleaning process.

The photoreticulation step in nitrogen atmosphere is executed after vacuum impregnation and surface cleaning, reaching a conversion degree of the methacrylic functionalities higher than 80%.

After the thermal treatment of the impregnated graphite at 120° C. for 10 minutes, the formulation present into the bulk of the material reaches a conversion degree of >80%, up to close to 100% (FIG. 2) (measurements executed by transmission spectroscopy FTIR Nicolet).

FIG. 2 shows the percentage of methacrylic functionalities in the example formulation AB69 as a function of the process. The first column in the diagram starting from left shows the conversion by UV fusion exposure (630 mJ/cm$^2$ in N$_2$).

The next column (second from left) shows the percentage of conversion of AB69 for a Karl Suss exposure (150 mJ/cm$^2$ in N$_2$).

The light colored column shows the percentage of conversion of AB69 for a Karl Suss exposure (200 mJ/cm$^2$ in N$_2$). And the column on the right shows the conversion at a thermal treatment for 10 min at 120° C., without UV exposure.

The material is than heated to 190° C. for 1 hour in order to promote reticulation of residual unreacted moieties. The high reticulation degree allows to reach a low surface tension (contact angle measured by water is >60°) and a high chemical resistance of the polymer toward water and solvent based inks containing, for example, any of alcohols, ketones, ethers and glycoethers.

The obtained composite material is compatible with water and solvent inks without exhibiting any damage after a 7 weeks contact at 45° C. This composite polymeric-graphite material is very inert and does not release contaminants into the liquids during the life of the printing system.

The chemical structure of examples of the components of the formulation according to preferred embodiments of the invention are:

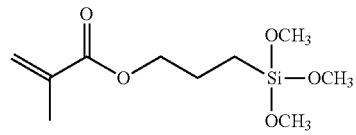

3-(Trimethoxysilyl)propyl methacrylate (Silquest A174 (Momentive)) as an example for the silane-acrylic adhesion promoter;

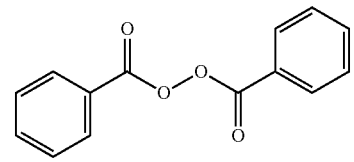 [SMILES: O=C(OOC(=O)c1ccccc1)c1ccccc1]

Benzoyl peroxide (Sigma-Aldrich) as an example for the radicalic thermal initiator; and

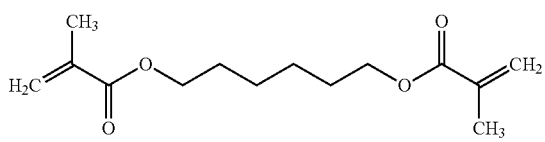 [SMILES: C=C(C)C(=O)OCCCCCCOC(=O)C(=C)C]

1,6-Hexanediol dimethacrylate as a preferred example for the acrylate monomer.

The invention claimed is:

1. A formulation capable of impregnating a porous sintered material, said formulation comprising
   40-90 wt.-% of an acrylic monomer selected from the group consisting of 1,6-hexanediol dimethacrylate and Glycerol propoxylate triacrylate,
   0.1-10 wt.-% of a radicalic thermal initiator,
   0.1-10 wt.-% of a radicalic photoinitiator,
   5-30 wt.-% of an organosilane adhesion promoter and
   0.05-5 wt.-% of a siliconic surfactant.

2. The formulation according to claim 1, wherein the radicalic thermal initiator is selected from the group consisting of Benzoyl Peroxide, tert-Butyl hydroperoxide, Dicumyl peroxide, Lauroyl peroxide and tert-Butyl peroxide.

3. The formulation according to claim 1, wherein the content of the organosilane adhesion promoter is 5-25 wt.-%.

4. The formulation according to claim 1, wherein the content of the siliconic surfactant is 0.05-1 wt.-%.

5. A method for impregnating a porous sintered material, comprising the following steps performed in the order as listed:
   dipping the porous sintered material into the formulation according to claim 1,
   vacuum treating the dipped porous sintered material,
   removing excess liquid from the surface of the dipped porous sintered material,
   exposing the dipped porous sintered material to light radiation, and
   heat treating the dipped porous sintered material.

6. The method according to claim 5, wherein the vacuum treating is conducted at a pressure of ≤10 mbar for 10 minutes to 3 hours.

7. The method according to claim 5, wherein light exposing is at wavelengths of 200-400 nm.

8. The method according to claim 5, wherein heat treating is conducted at temperatures of 80-200° C. for 1 to 60 min.

9. The method according to claim 5, wherein light exposing is performed in an inert atmosphere.

10. The method according to claim 5, wherein the porous sintered material is graphite.

11. The method according to claim 5, wherein the porosity of the sintered material is in the range of 2 to 8 vol.-%.

12. The method according to claim 11, wherein the porosity of the sintered material is about 5 vol.-%.

* * * * *